United States Patent
Bradley

[11] Patent Number: 5,274,609
[45] Date of Patent: Dec. 28, 1993

[54] COMBINATION LANTERN AND BUG LIQUIDATOR

[76] Inventor: William T. Bradley, 61 Summit Ave., North Adams, Mass. 01247

[21] Appl. No.: 925,115

[22] Filed: Aug. 6, 1992

[51] Int. Cl.$^5$ .................. A01M 1/04; F21L 19/00
[52] U.S. Cl. ..................... 362/179; 362/266; 362/363; 43/113
[58] Field of Search ............. 43/132.1, 133, 112, 43/113; 362/167, 168, 174, 177, 266, 363, 179

[56] References Cited

U.S. PATENT DOCUMENTS

| | | | |
|---|---|---|---|
| 679,848 | 8/1901 | Jessup | 43/113 |
| 1,983,423 | 12/1934 | Whitaker | 43/113 |
| 4,692,611 | 10/1990 | Millard | 43/113 |

*Primary Examiner*—Albert J. Makay
*Assistant Examiner*—L. Heyman
*Attorney, Agent, or Firm*—Leonard S. Michelman

[57] ABSTRACT

A glass globe for the purpose of preventing insects from blocking out the source of light in a portable lantern has two prearranged doors. The doors cover approximately 30 to 40% of the surface area of the globe and are made of a fire resistant material with a light reflective surface. The doors open back to back from the same hinge area and are biased by springs circumscribing their hinge rod assemblies. The doors, when open, prevent the wind from blowing out the lantern flame and yet permit bugs and insects to enter to the inside area of the glass globe whereby they become burned and liquidated. The doors are mounted within a fire proof frame and made of a polished metal material so as to give light reflection and reduce the light loss from the light source. The glass globe is made of various sizes to replace the various size globes in the conventional commercial portable lanterns. The doors are mounted on a hinge rod and biased by helical springs circumscribing the rod. The rods are anchored in flanges on the door frames and pass through sleeves on the face of the doors. There are latches on each door that connect to a pin in the frame for enabling the doors to be closed against the tension of the springs. The door frame engages the glass globe by means of recesses in the frame.

7 Claims, 3 Drawing Sheets

COMBINATION LANTERN AND BUG LIQUIDATOR

BACKGROUND AND SUMMARY OF INVENTION

This invention is concerned with lanterns and particularly a method of killing bugs and still obtaining light from the lantern as well as the prevention of the flame of the lantern from being extinguished.

A typical lantern, such as a Coleman Lantern, has a silk screen mantel and a glass globe circumscribing the mantel with a base in which a hydrocarbon fuel is located. These lanterns are generally used by people who do outside camping, and sleep out at night.

The typical lantern to which this invention is addressed has a glass globe circumscribing the lantern.

These type of lanterns become objectionable when during a warm evening, bugs and insects are attracted to the light. They become a nuisance. Thousands of bugs are known to do this and block off the light from the flame of the lantern. In addition to this objection, a person in the area of the lantern or wishing to pick up a lantern to move it to another location, is molested by these bugs.

The problem to be solved is to eliminate the insects and bugs, and maintain the light source efficiency. It has been discovered that by making two doors which open from the same vertical support area so that the doors open back to back, that the draft from winds will not put out the flame. Further, since these doors are made of a highly reflective material, such as polished aluminum, they enable the light of the lantern to be reflected, but also permit the bugs to enter into the combustion area of the flame and to become burned and destroyed.

The reflectors, which are two doors mounted back to back on a seperate hinge supports, when opened, permit the entire light source to be available. When these doors are closed, they cover approximately 30–40% of the total area surrounding the light source created by the flame, but reflect the light towards the glass, so that the light loss covered by the doors is only slightly reduced.

OBJECTS OF THE INVENTION

It is a primary object of the within invention, to provide a glass globe for a portable lantern operated by a flame type silk mantel from a hydrocarbon fuel source that has means for preventing bugs and insects from covering the glass transparency on the globe surrounding the source of the flame.

It is yet another object of the invention to provide a pair of hinged doors that permit insects and bugs to enter into the inside of the lamp and become destroyed and illuminated by the burning flame.

It is still another object of invention to provide hinged doors that prevent the burning flame from being extinguished by wind currents.

It is also another object of the invention to provide the aforesaid features at a low cost of manufacture.

It is a further object of the invention to provide a solution to the bug and insect problems and still permit sufficient light from the lantern to illuminate efficiently, the area where the lantern is to be used.

A further understanding of the within invention may be had by references to the following detailed specification, and to the drawings in which.

Figure 1:
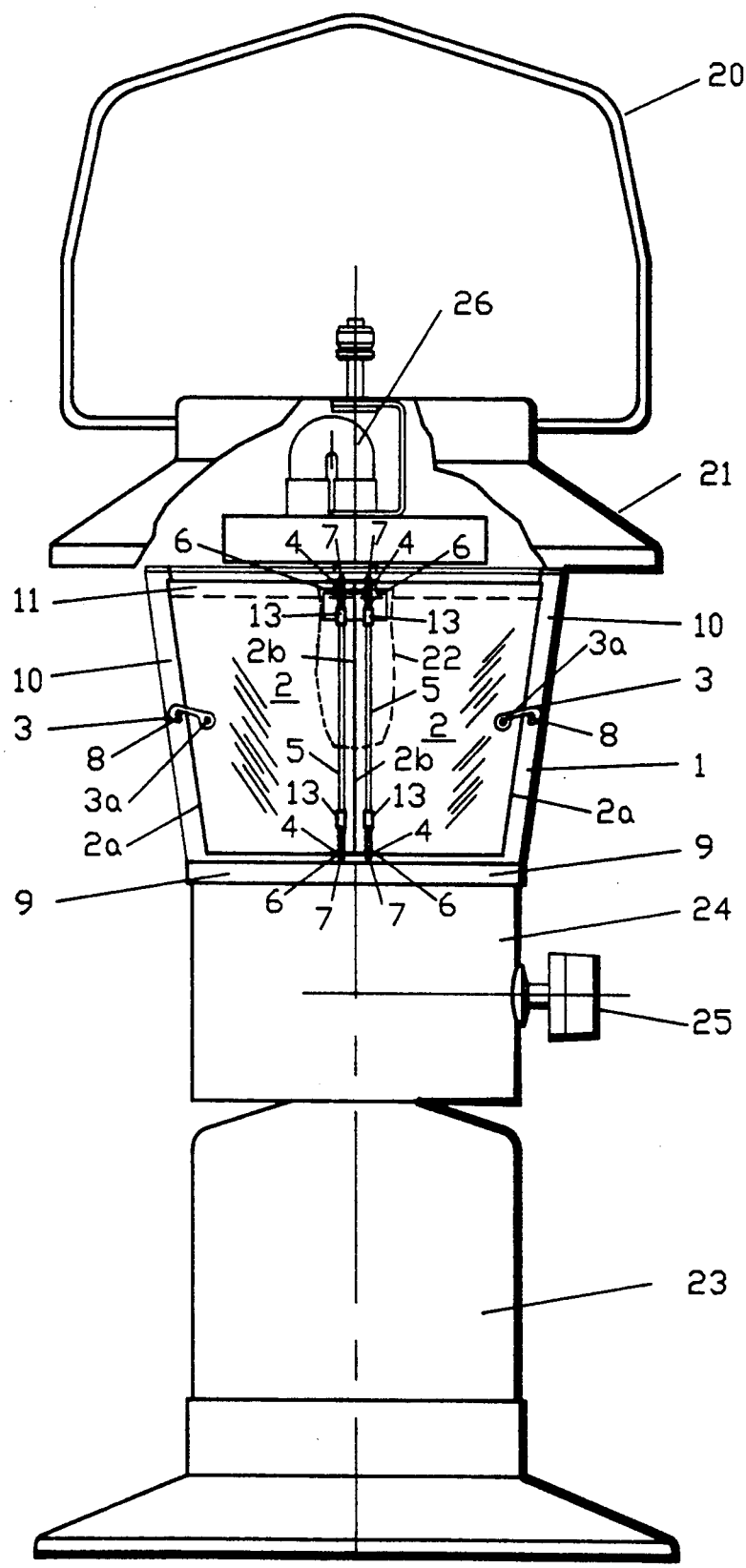
FIG. 1 is a front elevational view of a portable lantern showing the globe with the doors closed.

A lamp globe 1 that is typical of what is used in most portable lanterns such as a Coleman Lantern, has a pair of aluminum doors 2.

Each door 2 is mounted on a hinge rod 5 which said rods 5 are parallel to each other and proximate each to the other. Circumscribing the hinge rods 5, are the helical springs 6 for maintaining the doors in an open position. The doors 2 are mounted within the door frame which has a vertical side 10, an upper side 11, and a lower side 9. Extending outwardly from the upper side 11 and the lower side 9, are the flanges 4 which have openings 4a therein, that enable the hinge rods 5 to be inserted there through. The door frame members 10 and 11 have sleeves 12 for receiving the edges of the glass globe 1 to which said sleeve 12 are affixed.

At the end of each hinge rod 5, is a hinge end pin 7 which maintains the rods within the openings of the flanges 4. The end pin 7 is at right angles to the rods 5 and is a bent extension of rod 5.

Figure 2:
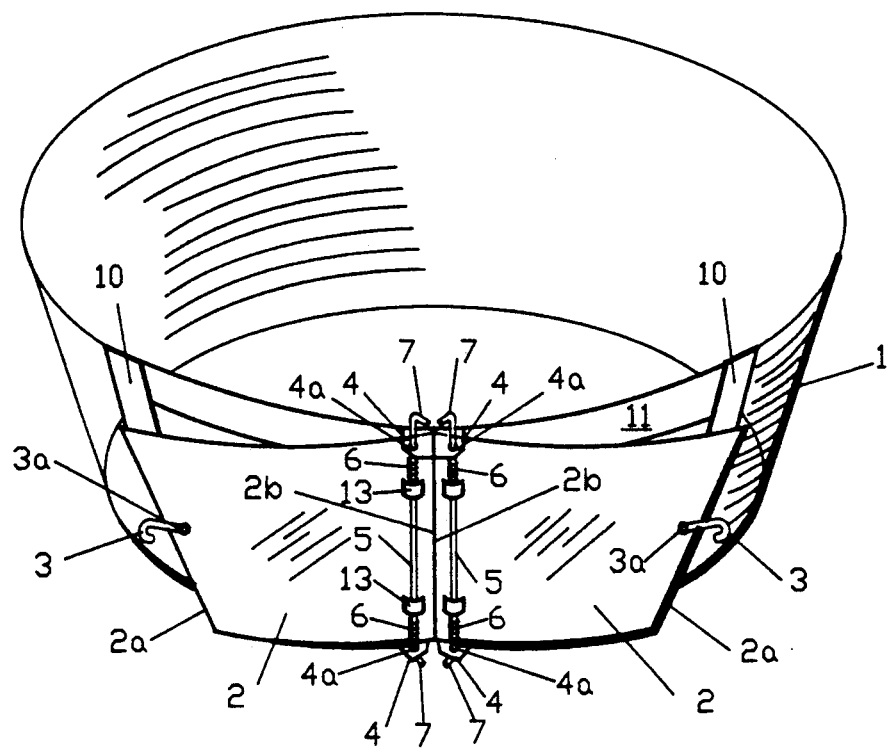
FIG. 2 is a perspective view of the globe that is used in FIG. 1 with the doors on the globe in an open position.
Figure 3:
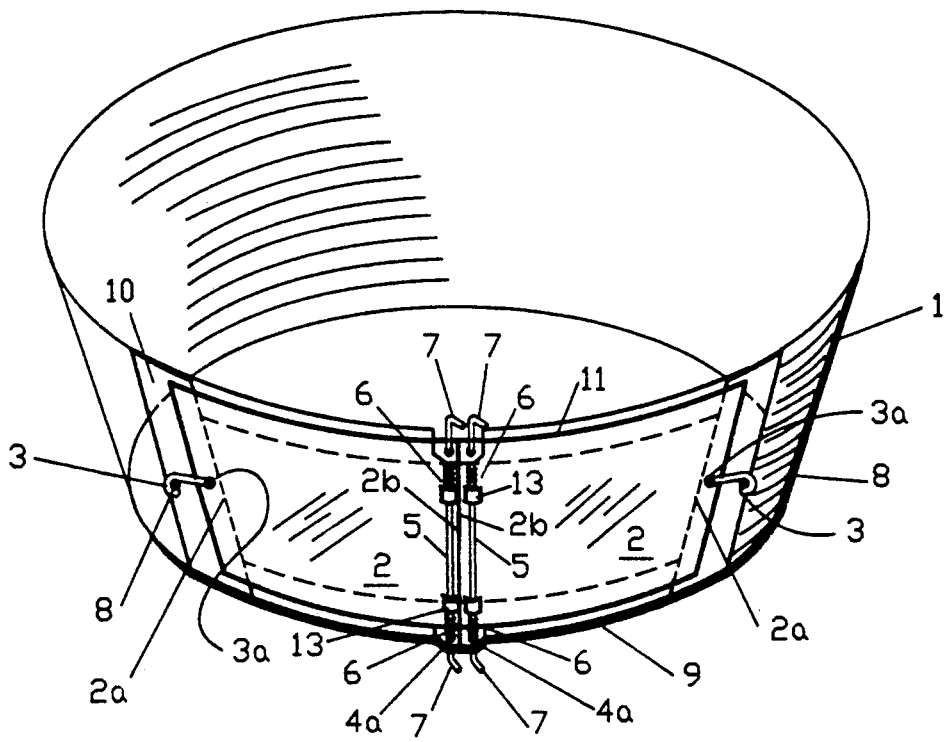
FIG. 3 is a perspective view of the globe in FIG. 1 with the doors in a closed position.
Figure 4:
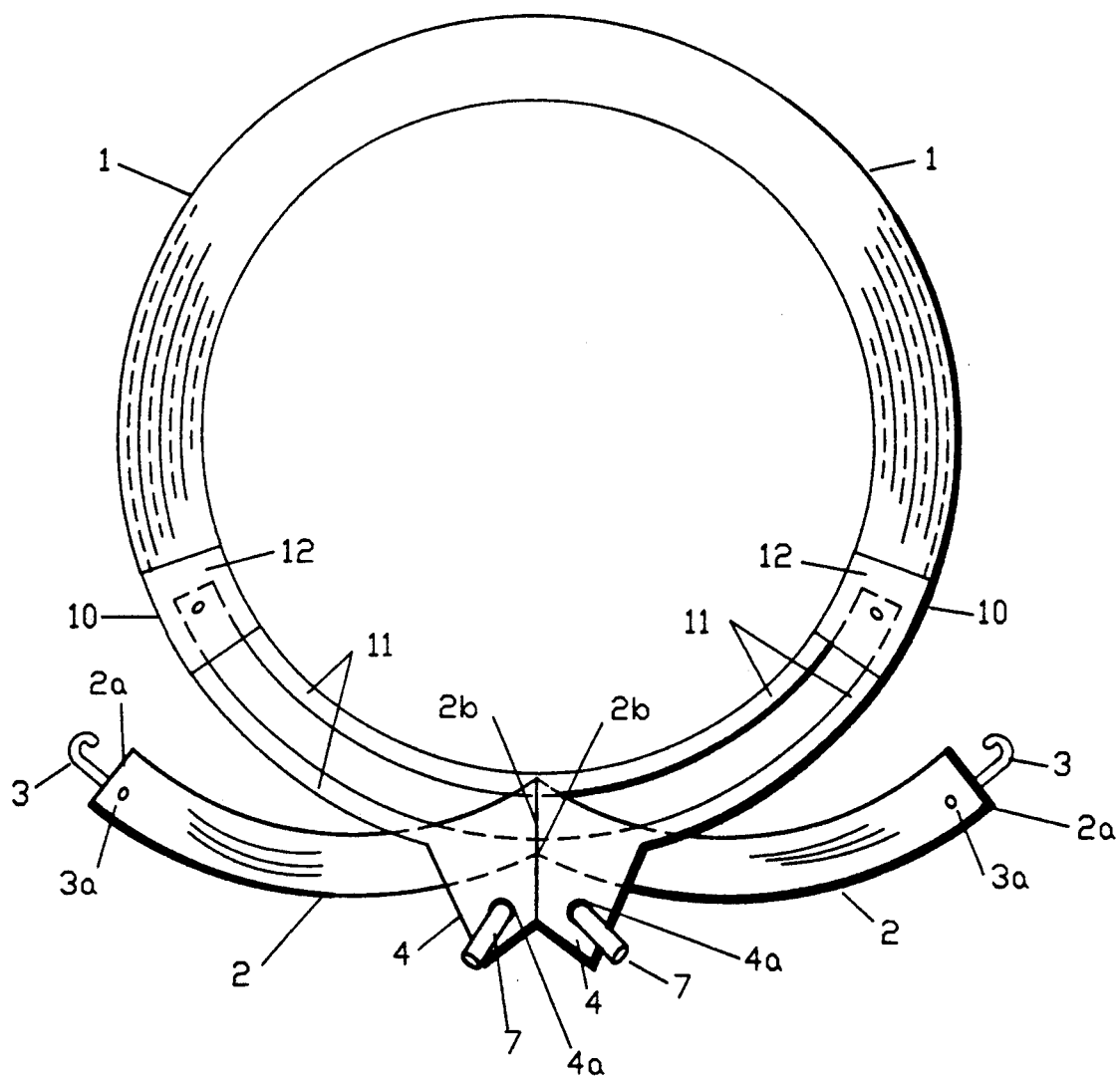
FIG. 4 is a diagrammatic view from the top elevation showing the doors in an open position.

Sleeves 13 are formed on each door 2 as shown clearly in FIGS. 2 and 3. The rods 5 pass therethrough. The sleeves 13 protrude above the surface of the doors 2 and allow the passage of air therebeneath to enter and pass from the inside area of the globe 1. The sleeves 13 are formed in the doors by cutting the metal at the top and bottom of each sleeve and by forcing same into the shape of a sleeve as shown in the memo of the drawings. Sufficient space is provided to enable the rods 6 to pass therethrough. It is contemplated that sleeves 13 could be cemented to the surface of the metal doors 2 to perform the function of housing the rods 5. This method has been found to be unstable, and more expensive. The preferred method as described is less expensive and permits ventilating of the lantern particularly when the doors 2 are closed. On the opposite sides of each door 2, is a hook latch 3. The hook latch 3 is mounted on a pivot 3a which permits the hook latch 3 to move up and down so as to engage the catch 8 for maintaining the doors 2 into a closed position as shown in FIG. 3. The catch 8 is a pin with a head mounted in the side frame 10. The outside edge 2a of the doors 2 are proximate to the hook latch 3. The inside edges 2b of the doors 2 are proximate each other. When the doors 2 are closed, the inside edge 2a makes planar contact with the surface of the vertical side 10 of the door 2.

The typical lantern handle 20 is connected to the canopy assembly 21.

There is a conventional flame assembly 22 within the globe 1. The bottom of the lantern has a stand assembly 23 to which the base of the lantern 24 is connected. There is a flame adjustment control 25 on the conventional lantern for the lantern fuel system 26.

This lamp globe 1, that has been described, has two doors, 2 which open back to back, with their hinge assemblies as described proximate each other. The surfaces of the doors 2 conform to the configuration of the surface of the globe 1. When the doors 2 are closed, they form a shield and prevent wind from blowing out the lantern flame which occurs in an open globe where there are no doors. Further, when the doors are open, the insects and bugs enter into the inside of the globe 1 instead of forming on the globe surface or congregating proximate thereto, and become disintegrated and consumed by the heat of the burning flame.

Without the doors 2 being open and in a typical globe that has no doors, the bugs and insects are attracted to the light, and accumulate in the area of the glass globe. They diminish the effect of the lantern.

By using polished aluminum as the material for the doors 2, there is a considerable amount of reflection from the lantern light. This permits less loss of light by the use of the doors 2.

It is contemplated that other materials such as highly polished stainless steel and the like could also be used.

It is necessary to use, for the doors 2 and the frame 9, 10 and 11 material that is highly resistant to the intense heat caused by the flame. The sleeve 12 and the cement that fastens the glass to the frame 9, 10, and 11 requires characteristics of minimum coefficients of expansion from heat generated by the lantern flame.

The replacement of the conventional globe of a lantern is shown in FIG. 1. It is necessary to remove the existing glass globe and replace it with globe 1. Once the globe 1 is in place, operation of each of the doors is simple.

To open the doors 2, the user lifts the latch 3 from the catch 8. The doors then open under the tension of the helical springs 6 which are mounted on the hinge rods 5 which are shown in the view of FIGS. 2 and 3. Helical springs 6 bias and control the extent to which the doors 2 open, and maintain the doors 2 in an open position. The springs prevent the doors 2 from closing in a windy atmosphere.

The springs 6 further control the amount of the space of the doors 2 opening so that the wind will not extinguish the flame 25 and yet allow the doors 2 to be open enough to permit the bugs and insects to gain entry into the area on the inside of the globe 1 where they are burned and destroyed.

I claim:

1. A glass globe for portable lanterns comprising 2 doors, a frame for the doors, hinge means for said doors, each of said doors opening back to back on said hinge means, each of said door's hinge means being proximate the other door's hinge means, bias springs for maintaining said doors open against the forces of external winds, and means for locking said doors closed against the tension of said springs.

2. A glass globe for portable lanterns as described in claim 1 wherein said hinge means comprise a flange on the upper and lower door frame aligned in a vertical straight line, each with the other, a pair of sleeves extending outwardly from the surface of the doors at a predetermined distance from the edge of the doors, a hinge rod, said hinge rod passing through the flanges and the door sleeves, the bias springs comprising of helical springs mounted beneath each flange on the said rods whereby the springs exert tension on said rods, a hinge end pin pass at each end of said rods for securing said rods in operating position, and preventing them from falling through said flanges.

3. A glass globe as described in claim 1 whereby the means for locking the doors closed comprise a hook latch, a pivot pin, said hook latch secured to said pivot pin whereby the latch moves up and down on said pivot pin, said pivot pin attached to said door, a catch for said latch, said catch attached to each side of said door frame, whereby when each door is to be closed, the hook latch is placed over said catch, against the tension exerted by the springs.

4. A glass globe described in claim 2 whereby the means for locking the doors closed comprise a hook latch, a pivot pin, said hook latch secured to said pivot pin whereby the latch moves up and down on said pivot pin, said pivot pin attached to said door, a catch for said latch, said catch attached to each side of said door frame, whereby when each door is to be closed the hook latch is placed over said catch, against the tension exerted by the springs.

5. A glass globe as described in claim 1 whereby the frame for said 2 doors comprise 2 horizontal members, top and bottom, interconnected to 2 vertical members at each end thereof to form a rectangle adapted to support the doors, recesses in each member for receiving the edge of the glass globe, and flanges extending outwardly from the top and lower members for mounting a seperate hinge rod for each door.

6. A glass globe as described in claim 2 whereby the frame for said 2 doors comprise 2 horizontal members, top and bottom, interconnected to 2 vertical members at each end thereof to form a rectangle adapted to support the doors, recesses in each member for receiving the edge of the glass globe, and flanges extending outwardly from the top and lower member for mounting a seperate hinge rod for each door.

7. A glass globe as described in claim 3 whereby the frame for said 2 doors comprise 2 horizontal members, top and bottom, interconnected to 2 vertical members at each end thereof to form a rectangle adapted to support the doors, recesses in each member for receiving the edge of the glass globe, and flanges extending outwardly from the top and lower member for mounting the hinge rods for each door.

* * * * *